United States Patent
Wei et al.

(10) Patent No.: US 11,743,133 B2
(45) Date of Patent: Aug. 29, 2023

(54) AUTOMATIC ANOMALY DETECTION

(71) Applicant: International Business Machines Corporation, Armonk, NY (US)

(72) Inventors: Ke Wei Wei, Beijing (CN); Wei Liu, Beijing (CN); Guo Ran Sun, Beijing (CN); Shuang YS Yu, Beijing (CN); Meichi Maggie Lin, San Jose, CA (US); Yi Dai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 17/474,820

(22) Filed: Sep. 14, 2021

(65) Prior Publication Data
US 2023/0078661 A1  Mar. 16, 2023

(51) Int. Cl.
| | |
|---|---|
| *H04L 41/16* | (2022.01) |
| *H04L 41/12* | (2022.01) |
| *G06F 16/35* | (2019.01) |
| *G06N 20/00* | (2019.01) |
| *G06F 16/33* | (2019.01) |
| *G06F 18/22* | (2023.01) |

(52) U.S. Cl.
CPC .......... *H04L 41/16* (2013.01); *G06F 16/3347* (2019.01); *G06F 16/35* (2019.01); *G06F 18/22* (2023.01); *G06N 20/00* (2019.01); *H04L 41/12* (2013.01)

(58) Field of Classification Search
CPC ..... H04L 41/16; H04L 41/12; G06F 16/3347; G06F 16/35; G06K 9/6215; G06N 20/00
See application file for complete search history.

(56) References Cited

U.S. PATENT DOCUMENTS

| | | | |
|---|---|---|---|
| 10,880,321 B2 | 12/2020 | Silver et al. | |
| 10,997,369 B1* | 5/2021 | Frazier | G06F 40/35 |
| 2020/0193305 A1 | 6/2020 | Braunstein et al. | |
| 2021/0049700 A1* | 2/2021 | Nguyen | G06N 3/08 |
| 2021/0089927 A9 | 3/2021 | Ryan et al. | |

OTHER PUBLICATIONS

Anonymous, "A System and Method of System Anomaly Identification by Tracing Back KPI Anomaly Chain," IP.com dated Feb. 1, 2019.

* cited by examiner

*Primary Examiner* — David R Lazaro
*Assistant Examiner* — Zia Khurshid
(74) *Attorney, Agent, or Firm* — Patterson + Sheridan, LLP (57) ABSTRACT

A method includes generating a plurality of vectors representing words in a plurality of documents about an information technology (IT) system and clustering the plurality of vectors to produce a plurality of clusters. The method also includes identifying a cluster of the plurality of clusters that contains a plurality of clustered vectors, generating a feature based on a plurality of words represented by the plurality of clustered vectors, and training a machine learning model to identify an anomaly in the IT system based on the feature.

20 Claims, 5 Drawing Sheets

AUTOMATIC ANOMALY DETECTION

BACKGROUND

The present invention relates to anomaly detection, and more specifically, to automatic anomaly detection using machine learning.

SUMMARY

According to an embodiment, a method includes generating a plurality of vectors representing words in a plurality of documents about an information technology (IT) system and clustering the plurality of vectors to produce a plurality of clusters. The method also includes identifying a cluster of the plurality of clusters that contains a plurality of clustered vectors, generating a feature based on a plurality of words represented by the plurality of clustered vectors, and training a machine learning model to identify an anomaly in the IT system based on the feature. Other embodiments include an apparatus that performs this method.

According to another embodiment, a method includes generating a plurality of vectors representing words in a plurality of documents about an information technology (IT) system. The plurality of vectors indicates at least one of a number of occurrences of a word in the plurality of documents or a proximity of the word to another word in the plurality of documents. The method also includes clustering the plurality of vectors to produce a plurality of clusters, generating features based on the plurality of clusters, and training a machine learning model to identify an anomaly in the IT system based on the features. Other embodiments include an apparatus that performs this method.

DETAILED DESCRIPTION

Many organizations use information technology (IT) systems to perform electronic data processing, recordkeeping, communications, and management. In many instances, these IT systems are critical to the organizations, and so the operation of these IT systems (e.g., reliability, dependability, uptime, etc.) is expected to be near flawless.

This disclosure contemplates a system that uses machine learning to identify or detect anomalies during the operation of an IT system (e.g. excessive computing resource usage, excessive locks and unlocks, operations performed out of order) that may signal that the IT system is experiencing a problem that should be addressed. The system trains the machine learning model using features derived from documents about the IT system. For example, the system may analyze manuals, blogs, issue tickets, and other documents to determine words in the documents that relate to performance indicators for the IT system. The system generates vectors representing these words. The vectors may reveal performance metrics that may be monitored during the operation of the IT system. The system further clusters these vectors. The clustered vectors reveal relationships between or amongst performance metrics, which the system may use to identify further performance metrics to be monitored. The system generates features based on the clustered vectors and uses these features to train the machine learning model. The trained machine learning model is then capable of analyzing these features during the operation of the IT system to predict or detect anomalies. As a result, anomalies and issues in the IT system are automatically detected based on existing knowledge bases. In certain embodiments, the system reduces downtime and improves reliability of the IT system.

Figure 1:
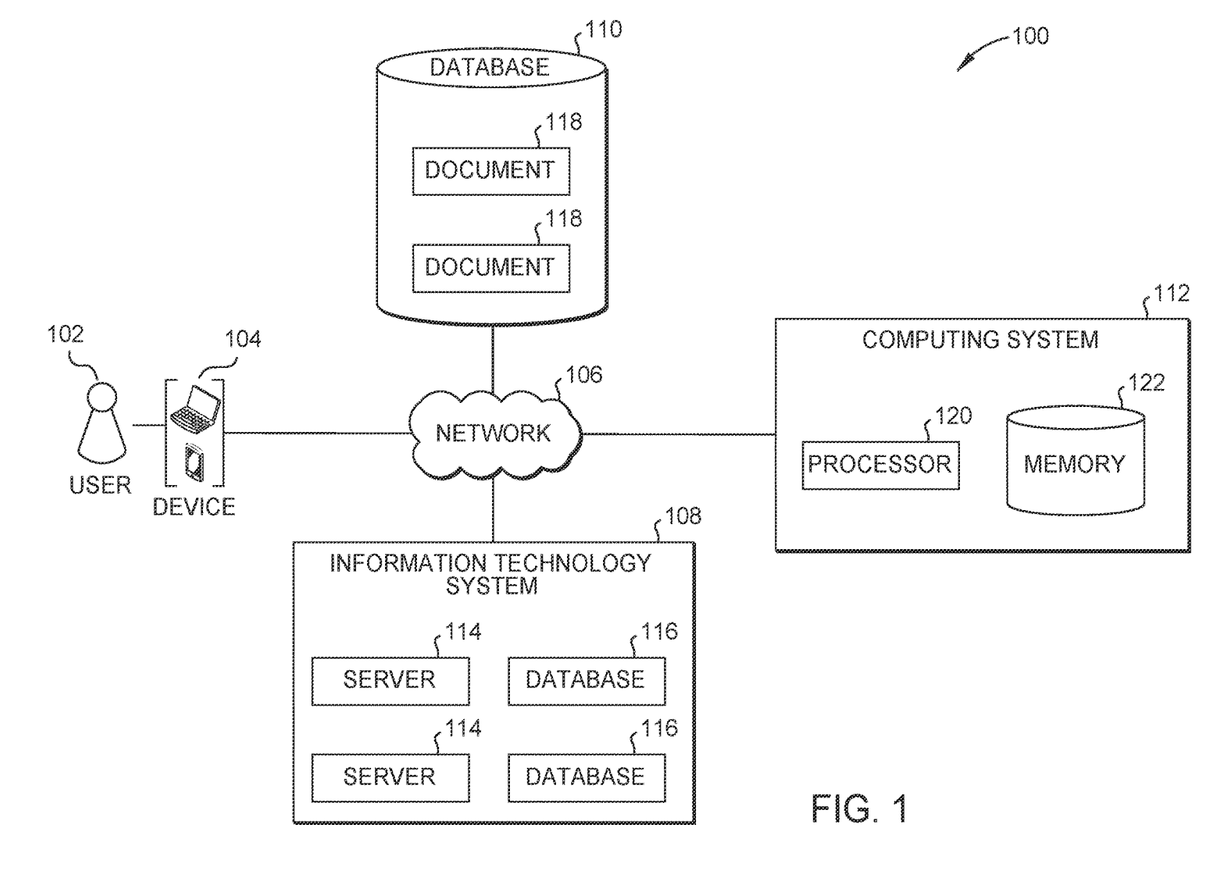
FIG. 1 illustrates an example system.

FIG. 1 illustrates an example system 100. As seen in FIG. 1, the system 100 includes one or more devices 104, a network 106, an information technology (IT) system 108, a database 110, and a computing system 112. The database 110 stores information about the IT system 108. The computing system 112 uses that information to train a machine learning model that can be used to predict or detect anomalies in the IT system 108. These anomalies may indicate issues or errors within the IT system 108 that should be addressed. In particular embodiments, these issues and errors may be resolved before they cause other, more significant issues to develop in the IT system 108.

A user 102 uses a device 104 to interact with other components of the system 100. For example, the device 104 may create, edit, and store information about the IT system 108 in the database 110. As another example, the device 104 may receive services from the IT system 108. As yet another example, the device 104 may communicate instructions to the computing system 112 to train a machine learning model using the information about the IT system 108 in the database 110. The device 104 may also receive messages from the computing system 112 indicating anomalies that were detected when the machine learning model was applied. The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The IT system 108 includes any suitable components that provide services to other components within the system 100. For example, the IT system 108 may include any suitable number of servers 114 and any suitable number of databases 116. The servers 114 and databases 116 may perform electronic data processing, recordkeeping, communications, and management for an organization. As the IT system 108 operates, issues and errors may develop in the IT system 108. For example, components of the servers 114 and/or databases 116 may degrade and perform sub-optimally. As a result, the performance of the IT system 108 may suffer. As another example, files or other information may be stored incorrectly within the databases 116, which causes the IT system 108 to experience issues when attempting to access those files or information. An administrator may monitor various performance metrics of the IT system 108 (e.g., computing resource usage in the servers 114 or databases 116, number of file accesses in the databases 116, etc.) to determine whether anomalies, issues, or errors are occurring in the IT system 108. The administrator may determine these performance metrics based on personal knowledge of the IT system 108. However, the administrator's knowledge of the IT system 108 may be limited and the administrator may use metrics that do not accurately indicate the anomalies within the IT system 108, which results in certain errors or issues remaining undetected. In certain embodiments, the system 100 uses information about the IT system 108 in the database 110 to train a machine learning model to detect anomalies in the IT system 108, which improves anomaly detection.

The database 110 stores an existing knowledge base for the IT system 108. As seen in FIG. 1, the database 110 stores documents 118 that contain information about the IT system 108. The documents 118 may be any suitable type of document that describes aspects of the IT system 108. For example, the documents 118 may be instruction manuals, blogs, forum posts, or issue tickets concerning the IT system 108. These documents 118 may describe the setup and operation of the IT system 108. The computing system 112 uses the documents 118 to train a machine learning model to detect anomalies in the IT system 108.

The computing system 112 uses information about the IT system 108 in the database 110 to train the machine learning model. Generally, the computing system 112 analyzes the words within the documents 118 to determine metrics that may be monitored to identify anomalies within the IT system 108. The computing system 112 may determine relationships between and amongst these metrics, which the computing system uses to further identify features. The computing system 112 then trains a machine learning model using these features. The computing system 112 may then monitor these features during the operation of the IT system 108 to predict or detect anomalies in the IT system 108. The anomalies are then addressed to resolve issues or errors in the IT system 108, in certain embodiments. As seen in FIG. 1, the computing system 112 includes a processor 120 and a memory 122, which perform the actions or functions of the computing system 112 described herein.

The processor 120 is any electronic circuitry, including, but not limited to one or a combination of microprocessors, microcontrollers, application specific integrated circuits (ASIC), application specific instruction set processor (ASIP), and/or state machines, that communicatively couples to memory 122 and controls the operation of the computing system 112. The processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 120 may include other hardware that operates software to control and process information. The processor 120 executes software stored on the memory 122 to perform any of the functions described herein. The processor 120 controls the operation and administration of the computing system 112 by processing information (e.g., information received from the devices 104, network 106, and memory 122). The processor 120 is not limited to a single processing device and may encompass multiple processing devices.

The memory 122 may store, either permanently or temporarily, data, operational software, or other information for the processor 120. The memory 122 may include any one or a combination of volatile or non-volatile local or remote devices suitable for storing information. For example, the memory 122 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 122, a disk, a CD, or a flash drive. In particular embodiments, the software may include an application executable by the processor 120 to perform one or more of the functions described herein.

Figure 2:
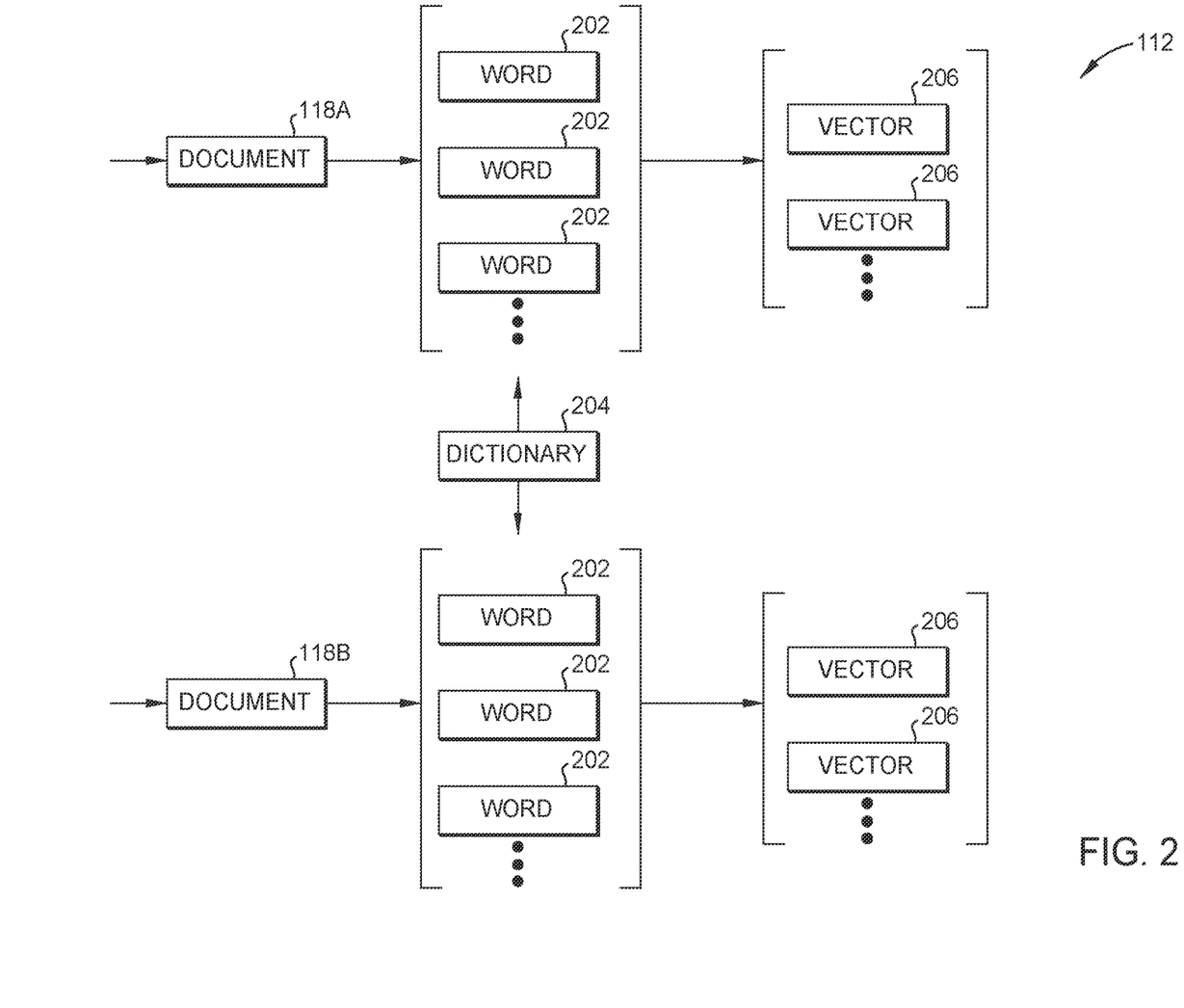
FIG. 2 illustrates an example computing system in the system of FIG. 1.

FIG. 2 illustrates an example computing system 112 in the system 100 of FIG. 1. In the example of FIG. 2, the computing system 112 processes documents 118 to identify words within the documents 118. The computing system 112 then generates vectors that represent the words. The computing system 112 subsequently uses the vectors to determine features and to train a machine learning model. In particular embodiments, by processing the documents 118 to generate the vectors, the computing system 112 uses an existing knowledge base to identify metrics to be monitored to automatically detect anomalies within an IT system.

The computing system 112 receives one or more documents 118 about an IT system. As discussed previously, the documents 118 may be stored in a database 110 (shown in FIG. 1) and may relate to an IT system 108 (shown in FIG. 1). In the example of FIG. 2, the computing system 112 receives a document 118A and a document 118B. The documents 118A and 118B may be any suitable document that describes an aspect of the IT system 108. For example, the documents 118A and 118B may be instruction manuals, blogs, forum posts, issue tickets, journal articles, patch notes, or technical documentation. The computing system 112 may receive and process any suitable number of documents 118 about the IT system 108. Each of the documents 118 includes words that describe the IT system 108. The computing system 112 identifies and analyzes the words within the documents 118 to generate vectors representing those words.

In some embodiments, the computing system 112 pre-processes the documents 118 before scanning the documents 118 to identify the words within the documents 118. For example, the computing system 112 may categorize the documents 118 based on their topics so that documents 118 in the same category or similar categories are analyzed together, which may improve model accuracy.

As seen in FIG. 2, the computing system 112 identifies words 202 in each of the documents 118A and 118B. The computing system 112 may apply a dictionary 204 to the documents 118A and 118B to identify the words 202. For example, the dictionary 204 may identify words that are considered stop words that should be ignored. The stop words may be words that do not convey much meaning. Because these words do not provide much value to the understanding of the IT system 108, the computing system 112 may ignore those words if they appear in the documents 118A or 118B. As another example, the dictionary 204 may identify words 202 that should be considered if those words 202 appear in the documents 118A or 118B. The computing system 112 may identify and consider those words 202 if the computing system 112 detects those words 202 in the documents 118A or 118B. The computing system 112 may scan the documents 118A and 118B to determine words within those documents 118A and 118B. The computing system 112 may then extract the words 202 from the documents 118A and 118B. As discussed previously, the computing system 112 may select which words 202 to extract from the documents 118A and 118B based on the dictionary 204.

In some embodiments, the dictionary 204 identifies replacement words for certain words in the documents 118. For example, the dictionary 204 may identify synonyms as replacement words. As another example, the dictionary 204 may identify full words or phrases as replacements for acronyms. When the computing system 112 encounters a word in a document 118 for which the dictionary 204 identifies a replacement word, the computing system 112 replaces that word with the replacement word from the dictionary 204. In this manner, certain words in the documents 118 may be replaced with other words that have similar meanings, which may make it easier to generate vectors, cluster the vectors, and train a machine learning model.

After identifying the words 202 that appear within the documents 118A and 118B, the computing system 112 generates vectors 206 that represent those words 202. Each vector 206 may be a numerical representation of a word 202 that appears in the documents 118A or 118B. The vectors 206 may also include information about the context surrounding the words 202. For example, a vector 206 may include additional information that indicates the proximity of a word 202 to another word 202 in the document 118. As a result, the vector 206 includes numerical information that represents the meaning of the word 202 as well as the proximity of the word 202 to other words 202 in the document 118. The computing system 112 uses these vectors 206 to determine metrics that may be monitored to detect anomalies in the IT system 108.

Figure 3:
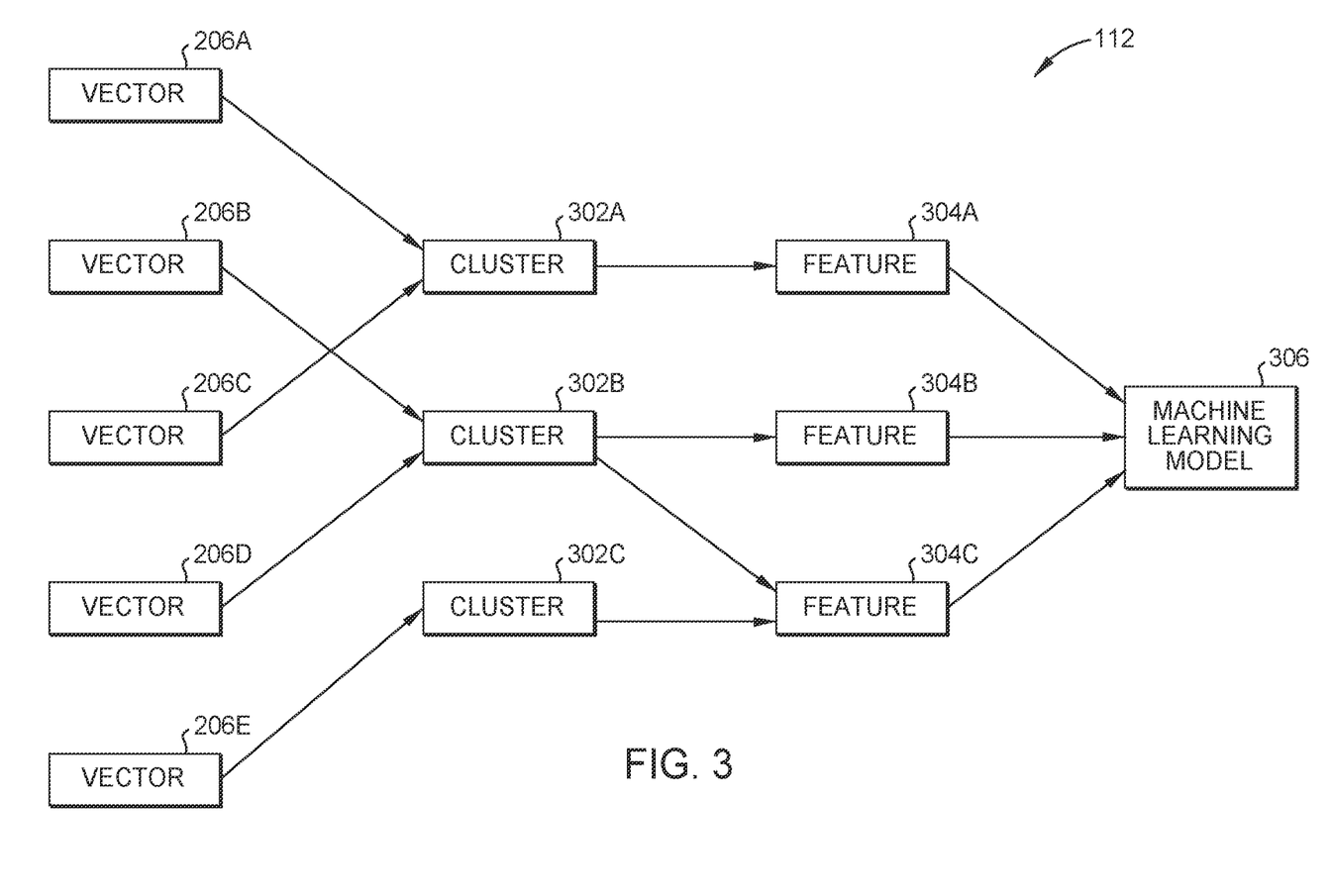
FIG. 3 illustrates an example computing system in the system of FIG. 1.

FIG. 3 illustrates an example computing system 112 in the system 100 of FIG. 1. As seen in FIG. 3, the computing system 112 clusters vectors 206 to identify features that are used to train a machine learning model. In particular embodiments, by training a machine learning model using features identified using clustered vectors, the machine learning model can monitor the features during the operation of an IT system to automatically detect anomalies within the IT system.

As discussed previously, the computing system 112 generates vectors 206 using words 202 (shown in FIG. 2) identified in documents 118 (shown in FIG. 1) describing an IT system 108 (shown in FIG. 10. The vectors 206 include numerical representations of words 202. The information within the vectors 206 may indicate the meanings of word 202, as well as the context around those words 202 within the documents 118. For example, the information may also indicate the proximity of a word 202 to other words 202 within the document 118. Thus, the vectors 206 include numerical representations of the meaning of the words 202. In the example of FIG. 3, the computing system 112 has generated the vectors 206A, 206B, 206C, 206D, and 206E. The computing system 112 may generate any suitable number of vectors 206 after processing any suitable number of documents 118 about the IT system 108. The vectors 206A, 206B, 206C, 206D, and 206E may have been generated based on words 202 in documents 118 that are in the same category or that pertain to the same topic or similar topics.

The computing system 112 clusters the vectors 206A, 206B, 206C, 206D, and 206E based on the information within the vectors 206A, 206B, 206C, 206D, and 206E. As a result, vectors 206 that are similar to each other may be assigned to the same cluster. For example, the computing system 112 may calculate distances between a vector 206 and the centroids of various clusters. The computing system 112 may then determine which centroid is closest to the vector 206 and assign the vector 206 to the corresponding cluster. As another example, the computing system 112 may cluster the vectors 206 by calculating distances between each pair of vectors 206. The computing system 112 then assigns vectors 206 that are close to each other to the same cluster. In the example of FIG. 3, the computing system 112 assigns the vectors 206A and 206C to a cluster 302A. The computing system 112 assigns the vectors 206B and 206D to a cluster 302B. The computing system 112 assigns the vector 206E to a cluster 302C. The computing system 112 may generate any suitable number of clusters 302 based on the vectors 206. In this manner, vectors 206 that are similar to each other are assigned to the same cluster 302. As a result, vectors 206 that represent words 202 that have similar meanings or close proximities are assigned to the same clusters 302.

The computing system 112 then analyzes the vectors 206 within each of the clusters 302 to determine features 304 to be monitored during the operation of the IT system 108. For example, the computing system 112 may analyze the vectors 206 in a cluster 302 to determine that words 202 with a similar meaning appear numerous times within the documents 118. In response, the computing system 112 determines a performance metric for the IT system 108 using this similar meaning of the words 202. The computing system 112 then determines a feature 304 representing this performance metric. As another example, the computing system 112 may analyze the vectors 206 in a cluster 302 to determine relationships between or amongst the words 202 represented by those vectors 206 (e.g., two words 202 with different meanings tend to appear in close proximity to one another in the documents 118). The computing system 112 then determines a performance metric using this relationship (e.g., a ratio of the number of occurrences of the two words 202). The computing system 112 then determines a feature 304 representing this relationship. In the example of FIG. 3, the computing system 112 determines the feature 304A based on the cluster 302A, the feature 304B based on the cluster 302B.

The computing system 112 may also determine a feature 304 based on multiple clusters 302. For example, the computing system 112 may determine that the cluster 302C is close in proximity to the cluster 302B (e.g., a centroid of the cluster 302C is close to a centroid of the cluster 302B). In response, the computing system 112 analyzes the vectors 206 in the clusters 302B and 302C together to determine relationships between words represented by those vectors 206. The computing system 112 may then determine features 304 based on the vectors 206 and the relationships between the vectors 206 in the clusters 302B and 302C. In the example of FIG. 3, the computing system 112 determines the feature 304C based on the clusters 302B and 302C.

The computing system 112 then trains a machine learning model 306 based on the features 304 determined from the clusters 302. In the example of FIG. 3, the computing system 112 trains the machine learning model 306 using the features 304A, 304B, and 304C. The machine learning model 306 may be trained to monitor these features 304 during the operation of the IT system 108. The training may teach the machine learning model 306 to predict or identify anomalies based on how these features 304 change during the operation of the IT system 108. As a result, the machine learning model 306 is trained to automatically detect anomalies within the IT system 108 using words 202 in documents 118 in existing knowledge bases.

As an example operation, the computing system 112 may process instruction manuals and issue tickets related to an IT system 108 to generate vectors 206 based on the words 202 within those documents 118. The computing system 112 then clusters those vectors 206 and analyzes the vectors 206 within each cluster 302 to determine relationships between or amongst the words 202 within the documents 118. For example, the computing system 112 may analyze the vectors 206 assigned to a cluster 302 to determine that the words "lock" and "unlock" have related meanings and that they appear within close proximity of each other in the documents 118. In response, the computing system 112 determines a feature 304 that is a ratio of the number of locks to the number of unlocks performed by an IT system 108. The computing system 112 then trains the machine learning model 306 to monitor the ratio of the number of locks to the number of unlocks performed by the IT system 108 to detect anomalies. For example, the machine learning model 306 may be trained to determine thresholds for this ratio such that when this ratio exceeds the thresholds, machine learning model 306 determines that an anomaly is occurring within the IT system 108. As a result, the machine learning model 306 is trained to detect anomalies based on relationships between different words 202 or concepts that appear in the documents 118, in addition to monitoring those metrics or concepts individually. For example, the machine learning model 306 may be trained to monitor the number of locks, the number of unlocks, and the ratio of the number of locks to the number of unlocks to detect anomalies within the IT system 108. In particular embodiments, the computing system 112 improves anomaly detection by automatically determining the features 304 based on documents 118 in existing knowledge bases, because the computing system 112 may determine features 304 that may not be identified or determined by an administrator in a manual detection system.

Figure 4:
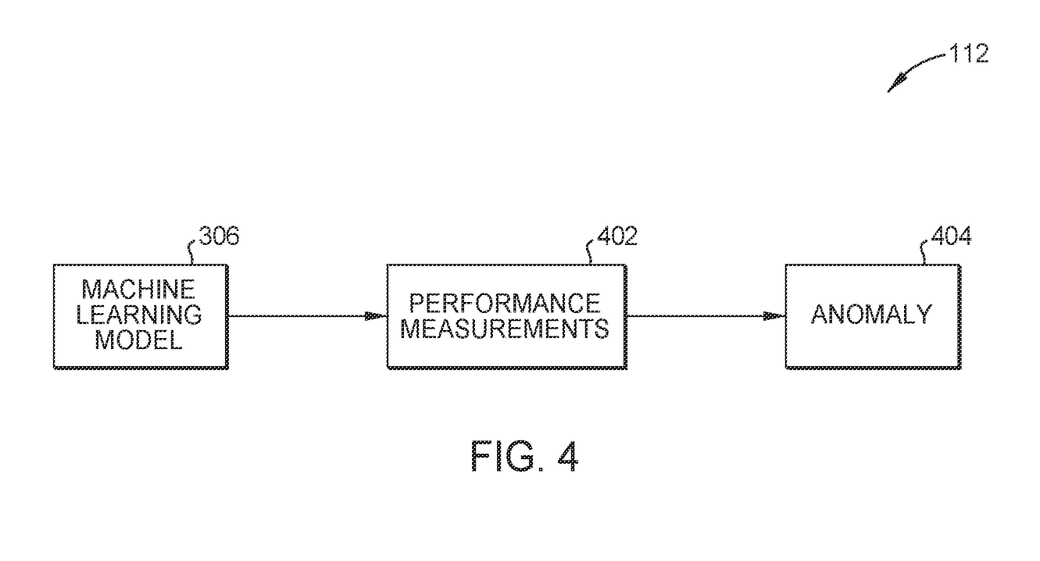
FIG. 4 illustrates an example computing system in the system of FIG. 1.

FIG. 4 illustrates an example computing system 112 in the system 100 of FIG. 1. As seen in FIG. 4, the computing system 112 applies a machine learning model 306 when monitoring the operation of an IT system 108 (shown in FIG. 1) to automatically detect anomalies.

The computing system 112 monitors an IT system 108 when the IT system 108 is operating. The computing system 112 captures performance measurements 402 while monitoring the operation of the IT system 108. The performance measurements 402 include measurements of certain metrics identified by the features 304 (shown in FIG. 3) used to train the machine learning model 306. Using a previous example, if a feature is the ratio between the number of locks and the number of unlocks performed in the IT system 108, then the performance measurements 402 may include the number of locks performed by the IT system 108 and the number of unlocks performed by the IT system 108. As another example, if a feature used to train the machine learning model 306 is the number of data accesses performed in the IT system 108, then the performance measurements 402 may include the number of data accesses performed in the IT system 108. As yet another example, if a feature used to train the machine learning model 306 is processor or memory usage within the IT system 108, then the performance measurements 402 include measurements of the processor usage and memory usage in the IT system 108.

The computing system 112 applies the machine learning model 306 to the performance measurements 402 to detect anomalies 404 in the IT system 108. The machine learning model 306 is trained to analyze the performance measurements 402 to predict or identify anomalies 404. For example, the machine learning model 306 may analyze the number of locks and the number of unlocks performed in the IT system 108 to determine whether there is an anomaly 404 in the IT system. The machine learning model 306 may have been trained to detect the anomaly 404 when the ratio of the number of locks to the number of unlocks exceeds a particular threshold set during training or when the rate of change of the ratio of the number of locks to the number of unlocks exceeds a particular threshold set during training. As another example, the machine learning model 306 may have been trained to detect the anomaly 404 when the processor or memory usage exceeds particular thresholds set during training or when the rate of change of the processor or memory usage exceeds a particular threshold set during training. The machine learning model 306 monitors the performance measurements 402 and communicates a warning or alert when the anomaly 404 is detected. A user or administrator may investigate the anomaly 404 and correct any issues or errors in response to the warning or alert. In certain embodiments, the machine learning model 306 detects the issue or error that caused the anomaly 404 and automatically corrects the issue or error.

Figure 5:
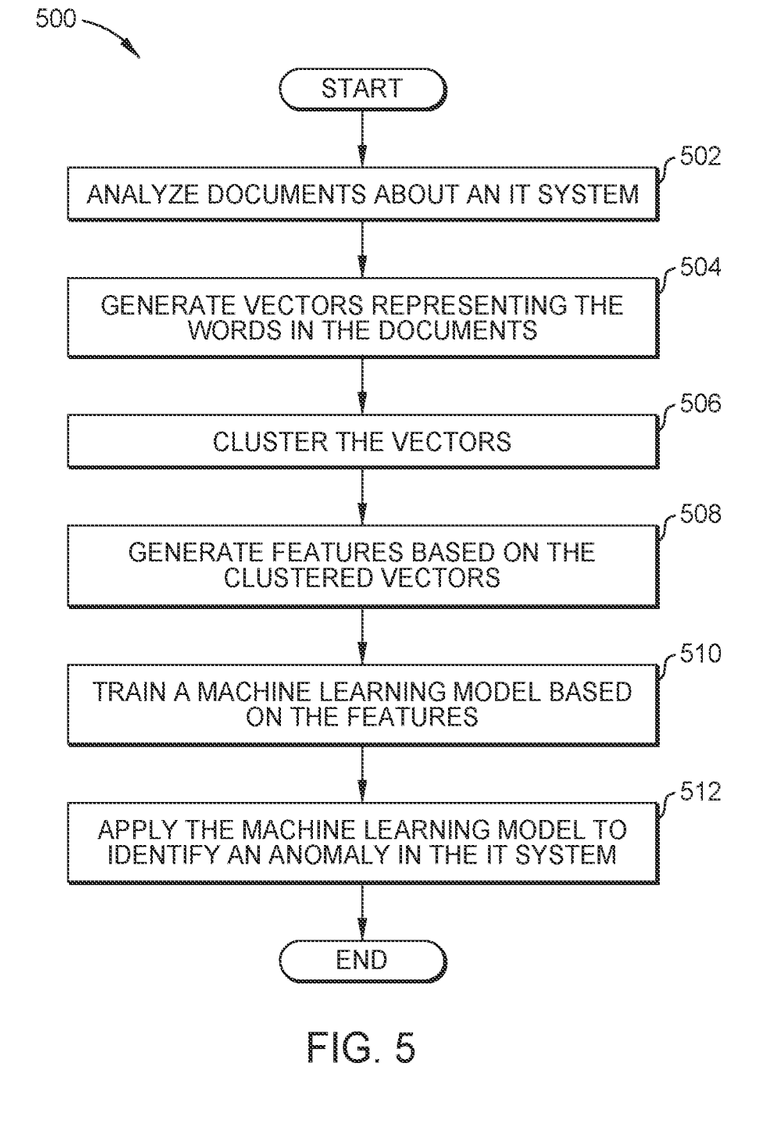
FIG. 5 is a flowchart of an example method performed in the system of FIG. 1.

FIG. 5 is a flowchart of an example method 500 performed in the system 100 of FIG. 1. In particular embodiments, the computing system 112 performs the method 500. By performing the method 500, the computing system 112 trains a machine learning model 306 to automatically detect anomalies in an IT system 108 using existing knowledge bases.

In block 502, the computing system 112 analyzes documents 118 about an IT system 108. These documents 118 may be any suitable documents 118 that describe the IT system 108. For example, the documents 118 may be instruction manuals, blogs, forum posts, issue tickets, patch notes, technical documentation, etc. The computing system 112 analyzes these documents 118 to identify the words 202 within the documents 118. In certain embodiments, the computing system 112 uses a dictionary 204 to identify relevant words 202 within the documents. For example, the dictionary 204 may identify stop words that should be ignored when the computing system 112 encounters them in the documents 118. As another example, the dictionary 204 may identify words 202 that should be identified and extracted when the computing system 112 encounters them in the documents 118. The computing system 112 scans through the words 202 in the documents 118 and extracts the relevant words 202 from the documents 118.

In block 504, the computing system 112 generates vectors 206 representing the words 202 in the documents 118. The vectors 206 may include a numerical representation of the meanings of the extracted words 202. Additionally, the vectors 206 may include a numerical representation of the context surrounding the words 202 in the documents 118. For example, the numerical representation may indicate the proximity of words 202 to other words 202 within the documents 118. As a result, the vectors 206 include a numerical representation of the meanings of extracted words 202.

In block 506, the computing system 112 clusters the vectors 206. For example, the computing system 112 may assign vectors 206 to particular clusters 302 based on the distances between the vectors 206 or distances between the vectors 206 and the centroids of the clusters 302. As a result, vectors 206 that are similar to each other may be assigned to the same clusters 302. Thus, the vectors 206 that are assigned to the same clusters 302 may represent words 202 that have similar meanings or words 202 that are proximate to each other in the documents 118.

In block 508, the computing system 112 generates features based on the clustered vectors 206. The computing system 112 analyzes the vectors 206 assigned to a particular cluster 302 to determine a feature 304. Vectors 206 that are assigned to the same cluster 302 may reveal relationships between words 202 or concepts that should be monitored. The computing system 112 identifies these concepts and relationships to generate the features 304. As an example, the computing system 112 may determine that vectors 206 representing the words "lock" and "unlock" are assigned to the same cluster 302. The computing system 112 may determine that the words "lock" and "unlock" have related meanings and appear in close proximity to each other in the documents 118. As a result, the computing system 112 may generate a feature 304 that is the ratio of the number of locks to the number of unlocks performed in an IT system 118.

In block 510, the computing system 112 trains a machine learning model 306 based on the generated features 304. The machine learning model 306 may be trained to monitor these features 304 during the operation of the IT system 118 to detect anomalies 404 within the IT system 118. For example, the machine learning model 306 may be trained to set thresholds for particular features 304. When those features 304 exceed these thresholds, the machine learning model 306 may predict or identify an anomaly 404 within the IT system 118.

In block 512, the computing system 112 applies the machine learning model 306 to identify an anomaly 404 in the IT system 118. The computing system 112 may monitor the operation of the IT system 118 to determine performance measurements 402. The computing system 112 then applies the machine learning model 306 to the performance measurements 402 to detect whether an anomaly 404 is occurring in the IT system 118. For example, the machine learning model 306 may compare the performance measurements 402 to particular thresholds that the machine learning model 306 is trained to set. If the performance measurements 402 exceed one or more of these thresholds, then the machine learning model 306 may predict or detect that an anomaly 404 is occurring in the IT system 118. In particular embodiments, the machine learning model 306 automatically resolves issues or errors that caused the anomaly 404 upon detection of the anomaly 404.

In summary, a computing system 112 uses machine learning to identify or detect anomalies 404 during the operation of an IT system 108 (e.g. excessive computing resource usage, excessive locks and unlocks, operations performed out of order) that may signal that the IT system 108 is experiencing a problem that should be addressed. The computing system 112 trains a machine learning model 306 using features derived from documents 118 about the IT system 108. For example, the computing system 112 may analyze manuals, blogs, issue tickets, and other documents to determine words 202 in the documents 118 that relate to performance indicators for the IT system 108. The computing system 112 generates vectors 206 representing these words 202. The vectors 206 may reveal performance metrics that may be monitored during the operation of the IT system 108. The computing system 112 further clusters these vectors 206. The clustered vectors 206 reveal relationships between or amongst performance metrics, which the computing system 112 may use to identify further performance metrics to be monitored. The computing system 112 generates features 304 based on the clustered vectors 206 and uses these features 304 to train the machine learning model 306. The trained machine learning model 306 is then capable of analyzing these features 304 during the operation of the IT system 108 to predict or detect anomalies 404. As a result, anomalies 404 and issues in the IT system 108 are automatically detected based on existing knowledge bases. In certain embodiments, the computing system 112 reduces downtime and improves reliability of the IT system 108.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access the computing system 112 or related data available in the cloud. Doing so allows a user to access information from any system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
generating a plurality of vectors representing words in a plurality of documents about an information technology (IT) system;
clustering the plurality of vectors to produce a plurality of clusters;
generating a feature based on a plurality of words represented by a plurality of clustered vectors in a cluster of the plurality of clusters, wherein the feature indicates a ratio of (i) a number of appearances of a first word of the plurality of words in the plurality of documents and (ii) a number of appearances of a second word of the plurality of words in the plurality of documents;
determining a first metric identified by the first word;
determining a second metric identified by the second word; and
training a machine learning model to identify an anomaly in the IT system while monitoring the first metric and the second metric.

2. The method of claim 1, further comprising applying the machine learning model to the system to detect the anomaly.

3. The method of claim 1, wherein the plurality of clustered vectors indicates a relationship between or amongst the plurality of words.

4. The method of claim 1, wherein a vector of the plurality of vectors indicates at least one of a number of occurrences of a word in the plurality of documents or a proximity of the word to another word in the plurality of documents.

5. The method of claim 1, wherein the plurality of documents comprises at least one of an instruction manual, a blog, or an issue ticket.

6. The method of claim 1, further comprising generating, based on a second plurality of words represented by a second plurality of clustered vectors, a second feature, wherein the machine learning model is trained to identify the anomaly further based on the second feature.

7. The method of claim 1, further comprising excluding a stop word in the plurality of documents from being considered when generating the plurality of vectors, wherein the stop word is identified based on a dictionary that comprises the stop word.

8. The method of claim 1, wherein generating the feature is further based on a vector in a second cluster, wherein the second cluster has a proximity to the cluster that meets a threshold proximity.

9. The method of claim 1, further comprising replacing a word in the plurality of documents with a synonym prior to generating the plurality of vectors.

10. An apparatus comprising:
a memory; and
a hardware processor communicatively coupled to the memory, the hardware processor configured to:
generate a plurality of vectors representing words in a plurality of documents about an information technology (IT) system;
cluster the plurality of vectors to produce a plurality of clusters;
generate a feature based on a plurality of words represented by the plurality of clustered vectors, wherein the feature indicates a ratio of (i) a number of appearances of a first word of the plurality of words in the plurality of documents and (ii) a number of appearances of a second word of the plurality of words in the plurality of documents;
determine a first metric identified by the first word;
determine a second metric identified by the second word; and
train a machine learning model to identify an anomaly in the IT system while monitoring the first metric and the second metric.

11. The apparatus of claim 10, the hardware processor further configured to apply the machine learning model to the system to detect the anomaly.

12. The apparatus of claim 10, wherein the plurality of clustered vectors indicates a relationship between or amongst the plurality of words.

13. The apparatus of claim 10, wherein a vector of the plurality of vectors indicates at least one of a number of occurrences of a word in the plurality of documents or a proximity of the word to another word in the plurality of documents.

14. The apparatus of claim 10, wherein the plurality of documents comprises at least one of an instruction manual, a blog, or an issue ticket.

15. The apparatus of claim 10, the hardware processor further configured to generate, based on a second plurality of words represented by a second plurality of clustered vectors, a second feature, wherein the machine learning model is trained to identify the anomaly further based on the second feature.

16. The apparatus of claim 10, the hardware processor further configured to exclude a stop word in the plurality of documents from being considered when generating the plurality of vectors, wherein the stop word is identified based on a dictionary that comprises the stop word.

17. The apparatus of claim 10, the hardware processor further configured to replace a word in the plurality of documents with a synonym prior to generating the plurality of vectors.

18. A method comprising:
generating a plurality of vectors representing words in a plurality of documents about an information technology (IT) system, wherein the plurality of vectors indicates at least one of a number of occurrences of a word in the plurality of documents or a proximity of the word to another word in the plurality of documents;
clustering the plurality of vectors to produce a plurality of clusters;

generating features based on the plurality of clusters, wherein the feature indicates a ratio of (i) a number of appearances of a first word in the plurality of documents and (ii) a number of appearances of a second word in the plurality of documents;

determining a first metric identified by the first word;

determining a second metric identified by the second word; and training a machine learning model to identify an anomaly in the IT system while monitoring the first metric and the second metric.

19. The method of claim 18, further comprising applying the machine learning model to the system to detect the anomaly.

20. The method of claim 18, wherein a vector of the plurality of vectors indicates at least one of a number of occurrences of a word in the plurality of documents or a proximity of the word to another word in the plurality of documents.

* * * * *